US012078001B1

(12) United States Patent
Dubois et al.

(10) Patent No.: US 12,078,001 B1
(45) Date of Patent: Sep. 3, 2024

(54) SPRING-BIASED HINGE

(71) Applicant: Each Jewels LLC, New York, NY (US)

(72) Inventors: Abigail L. Dubois, Danbury, CT (US); Lawrence H. Dubois, Danbury, CT (US)

(73) Assignee: Each Jewels LLC, New York, NY (US)

(*) Notice: Subject to any disclaimer, the term of this patent is extended or adjusted under 35 U.S.C. 154(b) by 0 days.

(21) Appl. No.: 18/594,927

(22) Filed: Mar. 4, 2024

Related U.S. Application Data

(63) Continuation-in-part of application No. 18/375,962, filed on Oct. 2, 2023, which is a continuation-in-part of application No. 18/231,744, filed on Aug. 8, 2023, now Pat. No. 12,004,633.

(51) Int. Cl.
*E05F 1/08* (2006.01)
*E05F 1/10* (2006.01)

(52) U.S. Cl.
CPC ......... *E05F 1/105* (2013.01); *E05Y 2201/474* (2013.01); *E05Y 2201/48* (2013.01); *E05Y 2600/41* (2013.01)

(58) Field of Classification Search
CPC .... A45D 8/20; A45D 8/24; E05D 3/06; E05D 3/08; E05D 3/12; E05F 1/1207; E05F 1/12; E05F 1/1253; E05F 1/08; E05F 1/1008; F16C 11/04; E05Y 2900/132; E05Y 2900/20; E05Y 2900/606; E05Y 16/282; E05Y 16/283; E05Y 16/285; E05Y 16/287; E05Y 16/302
See application file for complete search history.

(56) References Cited

U.S. PATENT DOCUMENTS 404,313 A * 5/1889 Smedes ...................... E05D 3/12 5/55.1
431,349 A * 7/1890 Hart ...................... E05F 1/1215 16/280
783,410 A * 2/1905 Bergoff ................. E05F 1/1284 16/293
2,290,219 A * 7/1942 Ulfving ................. E05F 1/1269 16/80
2,807,043 A * 9/1957 Gordon ................. E05F 1/1215 16/76
3,233,820 A * 2/1966 Williams .................. E05D 5/04 220/829
3,849,835 A * 11/1974 Jerila .................... E05F 1/1269 16/291

(Continued)

FOREIGN PATENT DOCUMENTS

CN 202055659 U * 11/2011
JP 2000130003 A * 5/2000
JP 2010106574 A * 5/2010

*Primary Examiner* — Chuck Y Mah

(74) *Attorney, Agent, or Firm* — Brian Beverly; Beeson Skinner Beverly, LLP

(57) ABSTRACT

A spring-biased hinge includes two hinge leaves each having a retaining structure extending along an inner edge thereof, each of two ends of one or more springs received in a spring-receiving aperture of one of the retaining structures and connected to one of the hinge leaves. The springs thereby join the hinge leaves together with the inner ends of the hinge leaves in abutting engagement to form an engagement seam which hides the springs.

19 Claims, 22 Drawing Sheets

(56) References Cited

U.S. PATENT DOCUMENTS 4,131,378 A * 12/1978 Daws ........................ E05D 3/12
16/388
4,393,541 A * 7/1983 Hujsak ................... B64G 99/00
244/172.6
4,452,373 A * 6/1984 Pearce ................... A45C 11/24
220/829
D293,489 S 12/1987 Franzino
4,731,904 A * 3/1988 Sprague ................ E05F 1/1083
267/74
5,101,842 A 4/1992 Ehmann
5,475,897 A * 12/1995 Satoh .................. E05D 11/1057
16/291
5,494,060 A 2/1996 Potut
D380,864 S 7/1997 Deakin et al.
5,842,482 A 12/1998 Potut
5,996,593 A 12/1999 Horman
6,038,737 A * 3/2000 Boright ................... E05F 1/002
16/292
6,041,792 A 3/2000 Kennedy
6,311,699 B1 11/2001 Horman
6,354,307 B1 3/2002 Potut
6,574,834 B2 * 6/2003 Fedon ....................... E05D 1/02
220/829
6,681,778 B1 1/2004 Salisbury et al.
7,302,221 B2 * 11/2007 Shyu .................. H04N 1/00519
399/125
7,788,767 B2 * 9/2010 Chen ..................... E05F 1/1016
16/80
8,276,598 B1 * 10/2012 Shepard ................... A45D 8/20
132/277
D715,997 S 10/2014 Lash
9,297,193 B1 * 3/2016 Martin .................. E05F 1/1215
10,051,937 B1 8/2018 Wenzel
2001/0006068 A1 7/2001 Bolito
2004/0231691 A1 11/2004 Shyu
2005/0235458 A1 * 10/2005 Zou ....................... H04M 1/022
16/287
2006/0124149 A1 6/2006 Salisbury et al.
2006/0225245 A1 * 10/2006 Conway .................. E05D 7/009
16/285
2008/0149129 A1 6/2008 Yang
2009/0255552 A1 10/2009 Hsu
2009/0272397 A1 11/2009 Defenbaugh et al.
2011/0271485 A1 * 11/2011 Irwin ........................ E05D 3/12
16/307
2012/0186602 A1 7/2012 Hsu
2016/0090768 A1 * 3/2016 Mooers ................. E05F 1/1284
16/286

* cited by examiner

SPRING-BIASED HINGE

CROSS-REFERENCE TO RELATED APPLICATIONS

This application is a continuation-in-part of application Ser. No. 18/375,962, filed Oct. 2, 2023, which is a continuation-in-part of application Ser. No. 18/231,744, filed Aug. 8, 2023.

BACKGROUND

Technical Field

The present invention relates generally to hinges and more particularly to hinges having independent hinge leaves that are coupled and oriented by one or more resilient materials, components, and/or springs located primarily behind the leaves, thus presenting a simplified outward appearance.

Description of Related Art

In many hinge mechanisms and applications, for example, those used in hair accessories, jewelry, foldable electronics, and cabinetry, hinges include prominently visible pins, knuckles, or connectors. A hinge with a simplified outward appearance with no visible pins, knuckles, or connectors would have a cleaner and more aesthetically pleasing appearance were it able to retain the functionality of a hinge such as allowing a large range of motion)(≥180°).

SUMMARY OF THE INVENTION

A spring-biased hinge has two hinge leaves each of including one or more retaining structures extending along an inner edge of the hinge leaf, at least one of the retaining structures having an abutment face. One or more springs each having tensed and relatively relaxed configurations have two or more spring ends each of which is retained by one of the retaining structures so that the one or more springs connect the hinge leaves together and enable the hinge leaves to pivot about and engagement seam formed by their inner edges between open and closed configurations. In the closed configuration, at least one of the abutment faces of the retaining structures of each hinge leaf in abutting engagement with one of the abutment faces of the retaining structure of the other hinge leaf. In the open configuration, the abutment faces of the retaining structures of each hinge leaf in angular distal disposition from the abutment faces of the retaining structures of the other hinge leaf.

In one embodiment of a spring-biased hinge, the springs comprise helical springs each end of which is received in a spring-receiving aperture in one of the retaining structures. In one form of a spring-biased hinge, the ends of the springs are retained by or at a retaining wall of each retaining structure, wherein the retaining wall is spaced from the abutment wall so that a length of the spring is disposed in the retaining structure.

In another embodiment of a spring-biased hinge, each end of the spring includes a coiled portion that is received in a bore in the retaining structure. The ends of the spring are connected by a resilient connector and the coiled portion of each end of the spring is fixed to one of the hinge leaves so that the coils are more tightly wound when the springs are in the open configuration than in the closed configuration.

In another embodiment, the retaining structures include an intermediate retaining structure nested between top and bottom retaining structures, the springs are received in apertures in the intermediate retaining structures and each end of the springs are fixed to one of the hinge leaves.

In other embodiments supplementary retaining structures are provided to help orient the hinge leaves with respect to each other.

In each of the embodiments of a spring-biased hinge according to the invention, any need for traditional pivot pins is eliminated and the spring or springs which bias the hinge leaves from an open to a closed configuration are hidden behind an engagement seam formed by abutment of the inner edges of the two hinge leaves providing a functional hinge with an improved aesthetic appearance over prior art hinges.

DETAILED DESCRIPTION OF THE ILLUSTRATED EMBODIMENT

Figure 1A:
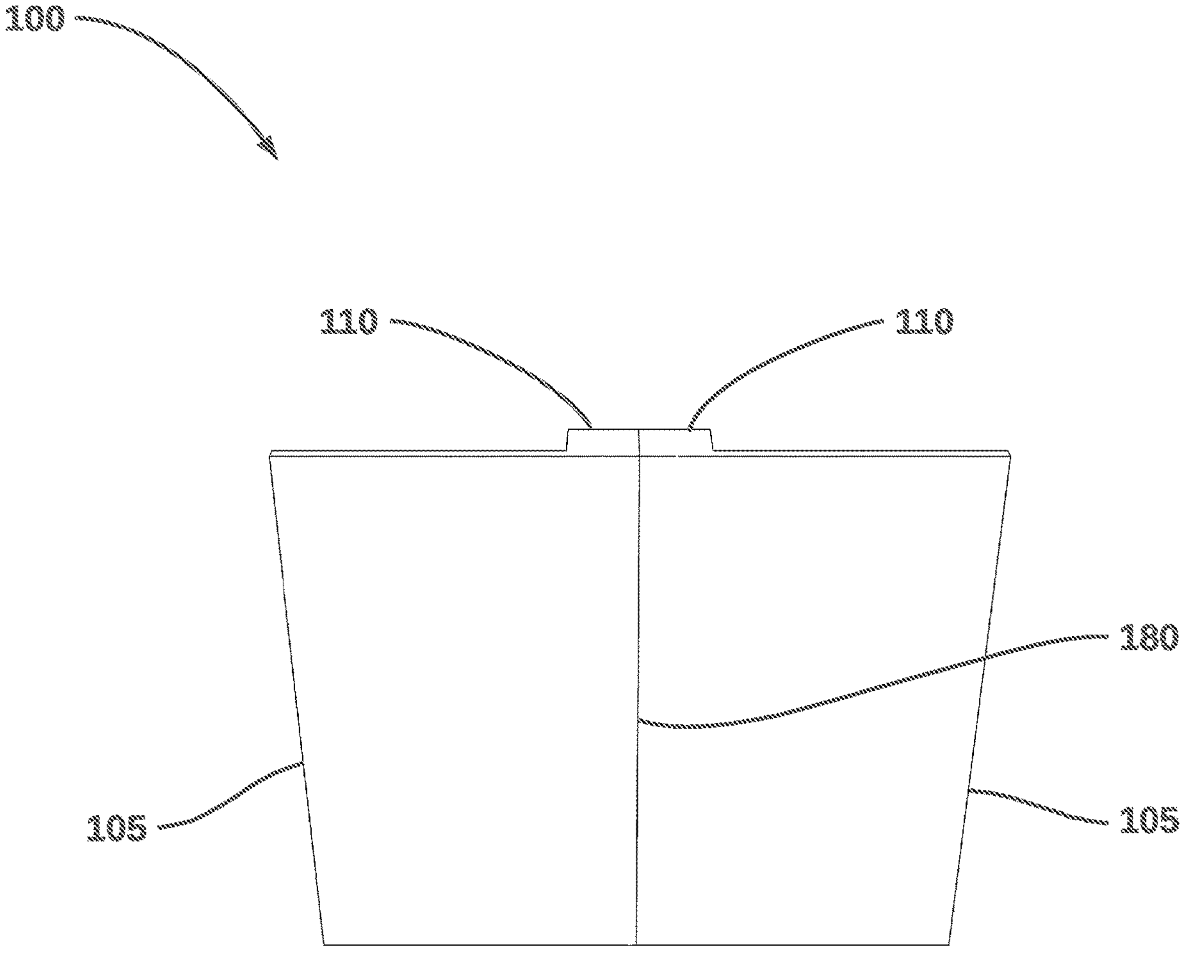
FIG. 1A is an upper front perspective view of a spring-biased hinge according to the invention in a closed configuration.

A spring hinge according to the invention is now described with respect to the accompanying illustrations. Referring to FIGS. 1A-1E, hinge 100 includes two hinge leaves 105 having retaining structures 110. In the illustrations the retaining structures 110 are shown having a square cross-section and the hinge leaves 105 butt flat against each other in the fully closed position seen in FIG. 1E. It will be understood that variations in the shape of the retaining structures 110, which allow the leaves to rotate or pivot with respect to each other, including angled, polygonal, multi-faceted, or curved shapes, e.g., portions of circles, parabolas, ellipses, catenaries, or organic shapes, fall within the ambit of this invention. And while a single retaining structure 110 is shown for each leaf in FIGS. 1A 1E, this invention anticipates that multiple divided retaining structures may be useful for certain applications. In other embodiments of the invention, stop surfaces of the hinge leaves or retaining structures may abut each other in a closed configuration.

Each retaining structure 110 has one or more spring receiving apertures 120 for receiving one or more springs 130. It will be understood that, while the embodiments described herein focus on springs, other resilient materials or devices that have an elastic body that recovers its original shape when released after being distorted fall within the ambit of this invention. The springs 130 both couple and orient the hinge leaves 105 with respect to each other. The springs 130 may be held in place by extrusions in the supports, bends or protrusions in the springs, additional pins or fasteners, adhesives, etc. These may be different for each end of the springs.

Figure 1B:
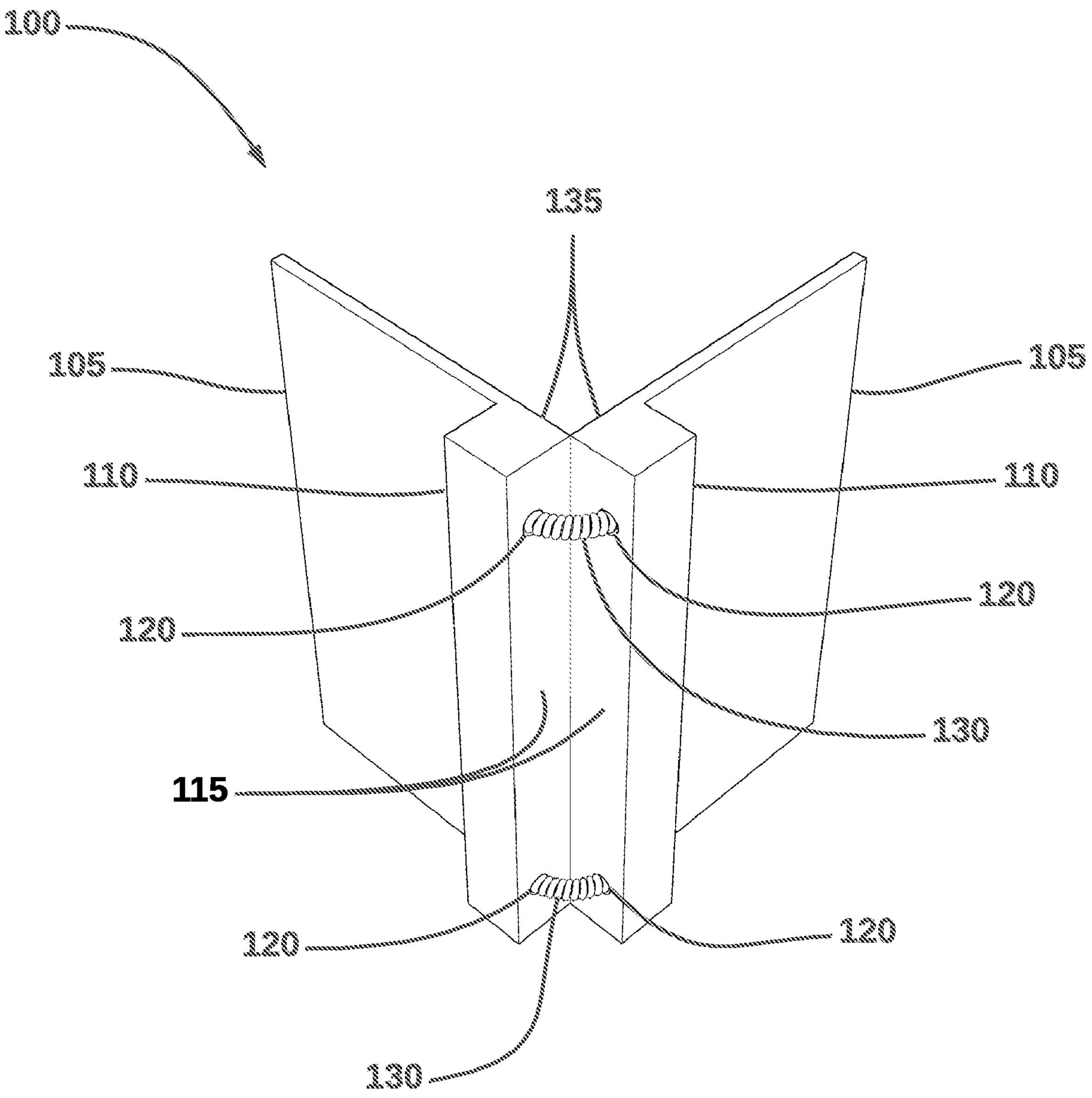
FIG. 1B is an upper rear perspective view thereof shown in a partially open configuration.
Figure 1C:
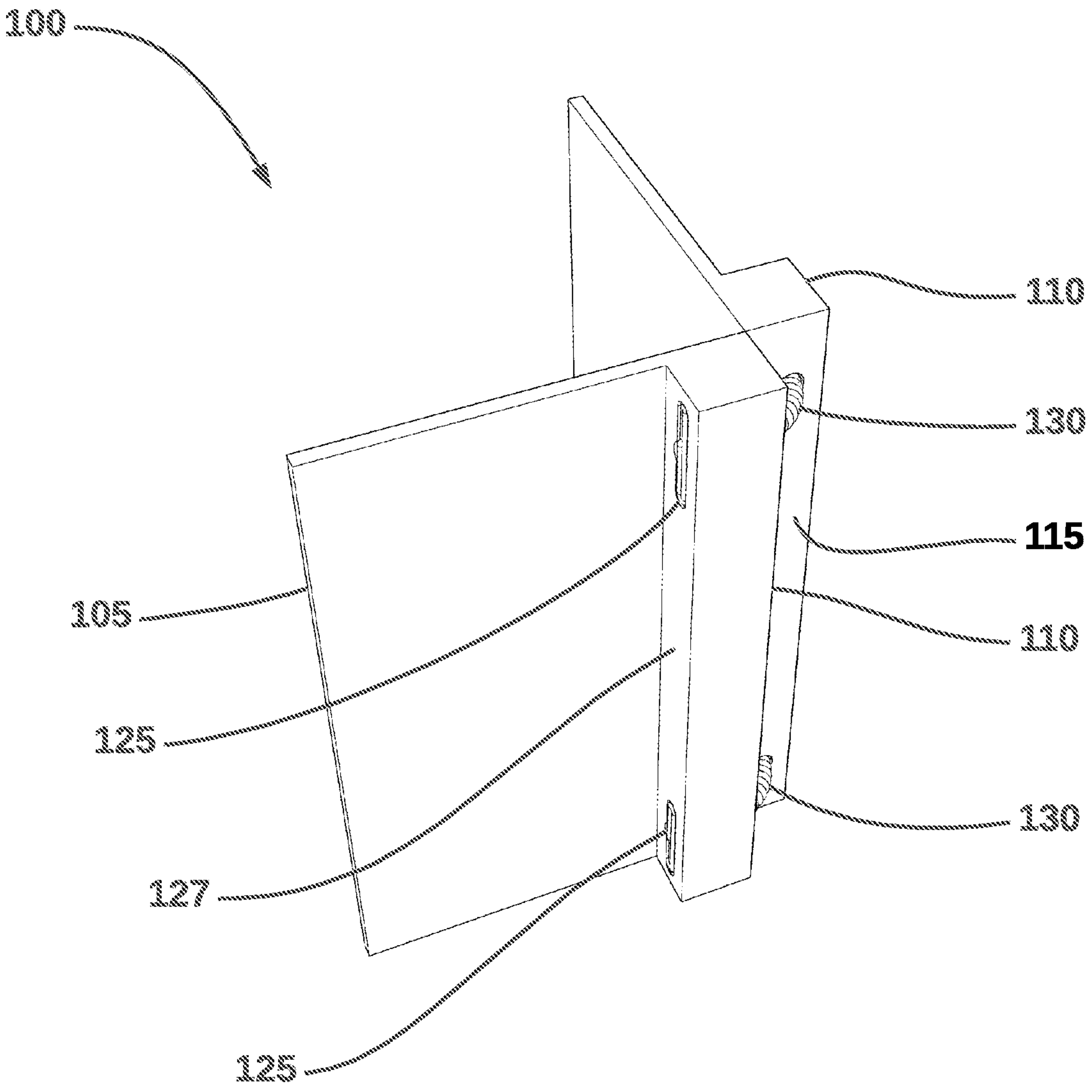
FIG. 1C is an upper left rear perspective view thereof showing the hinge in an assembled partially open configuration.
Figure 1D:
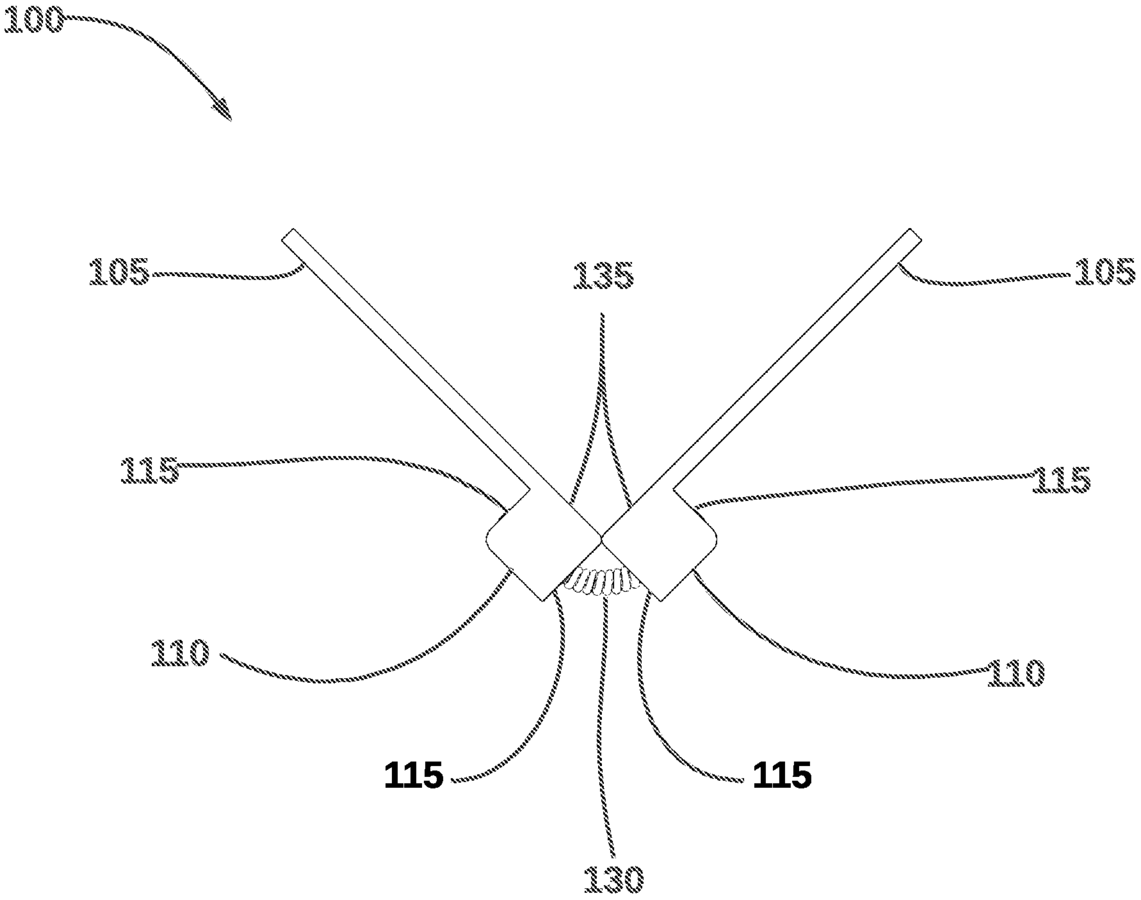
FIG. 1D is a top view thereof shown in a partially open configuration.
Figure 1E:
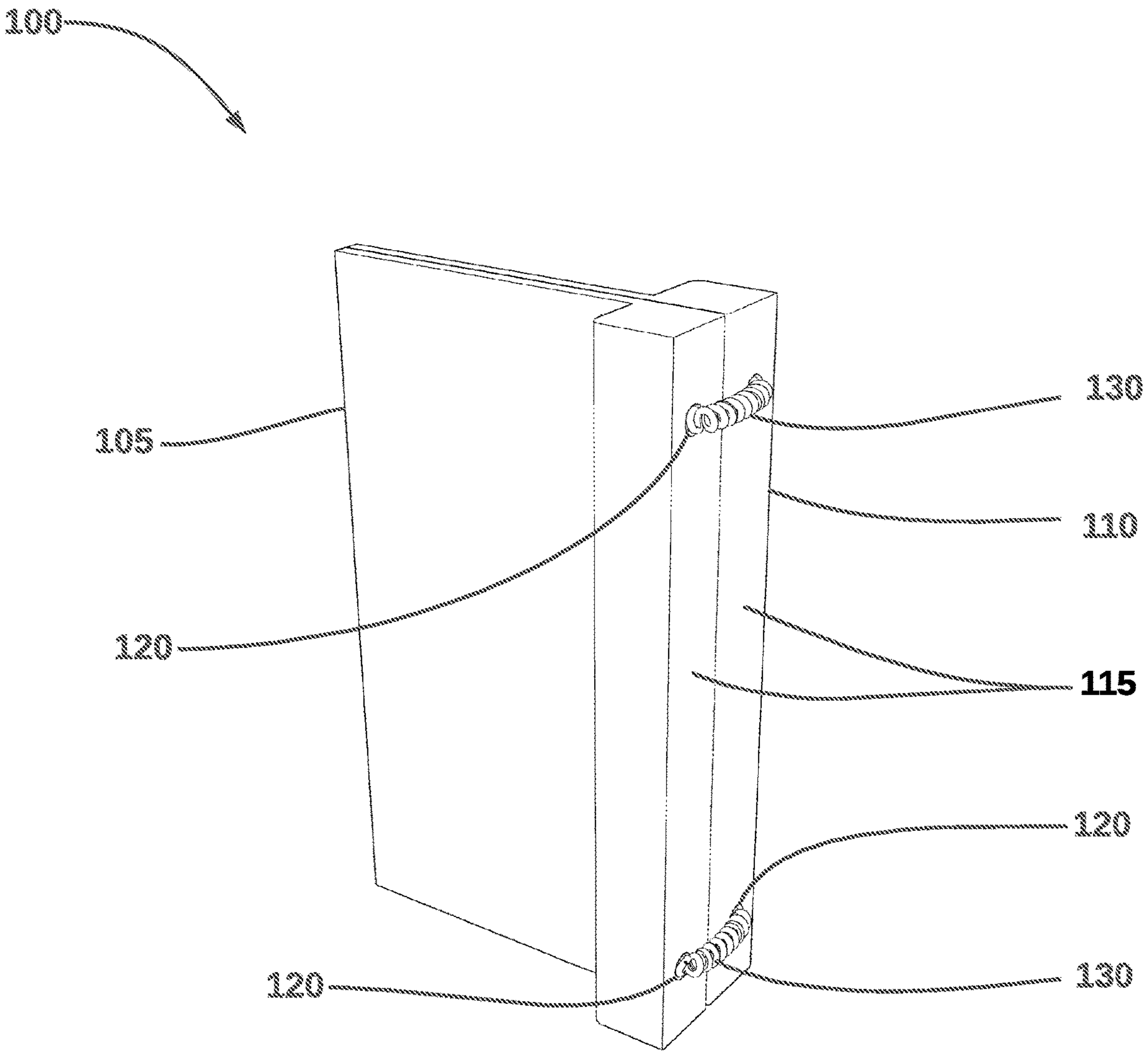
FIG. 1E is an upper rear perspective view thereof shown in a fully open configuration.
Figure 2A:
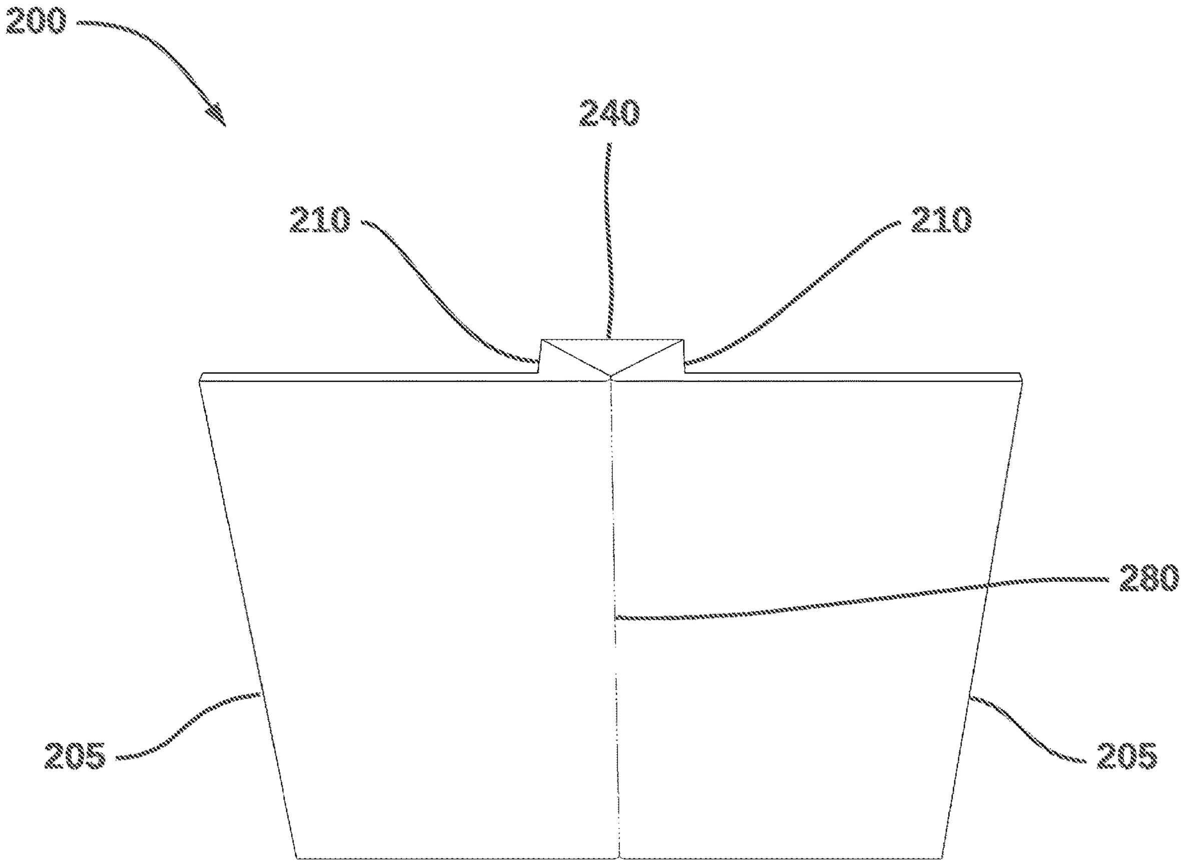
FIG. 2A is an upper front perspective view of a second embodiment of a spring-biased hinge according to the invention in a closed configuration.
Figure 2B:
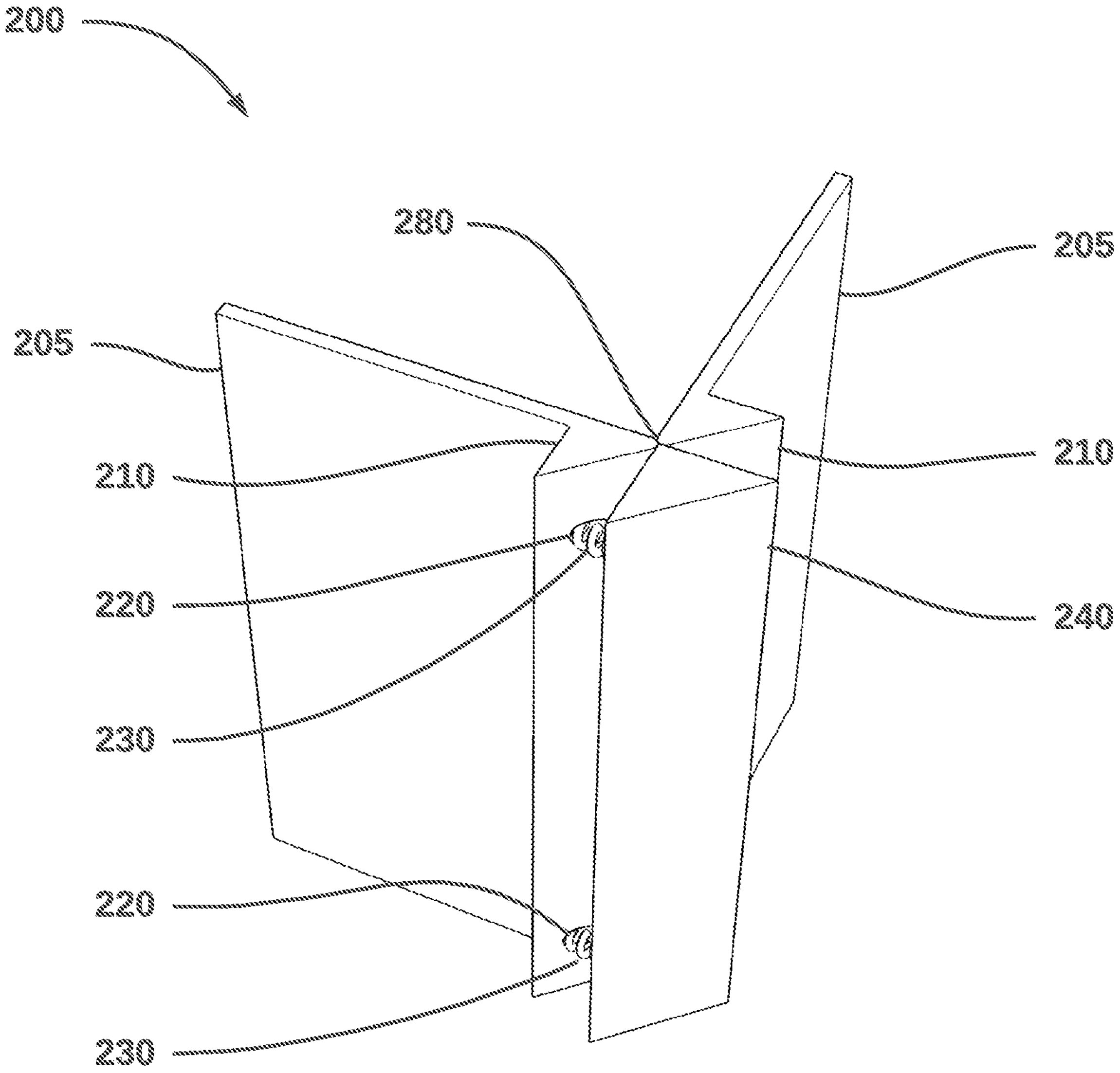
FIG. 2B is an upper rear perspective view thereof shown in a partially open configuration.
Figure 2C:
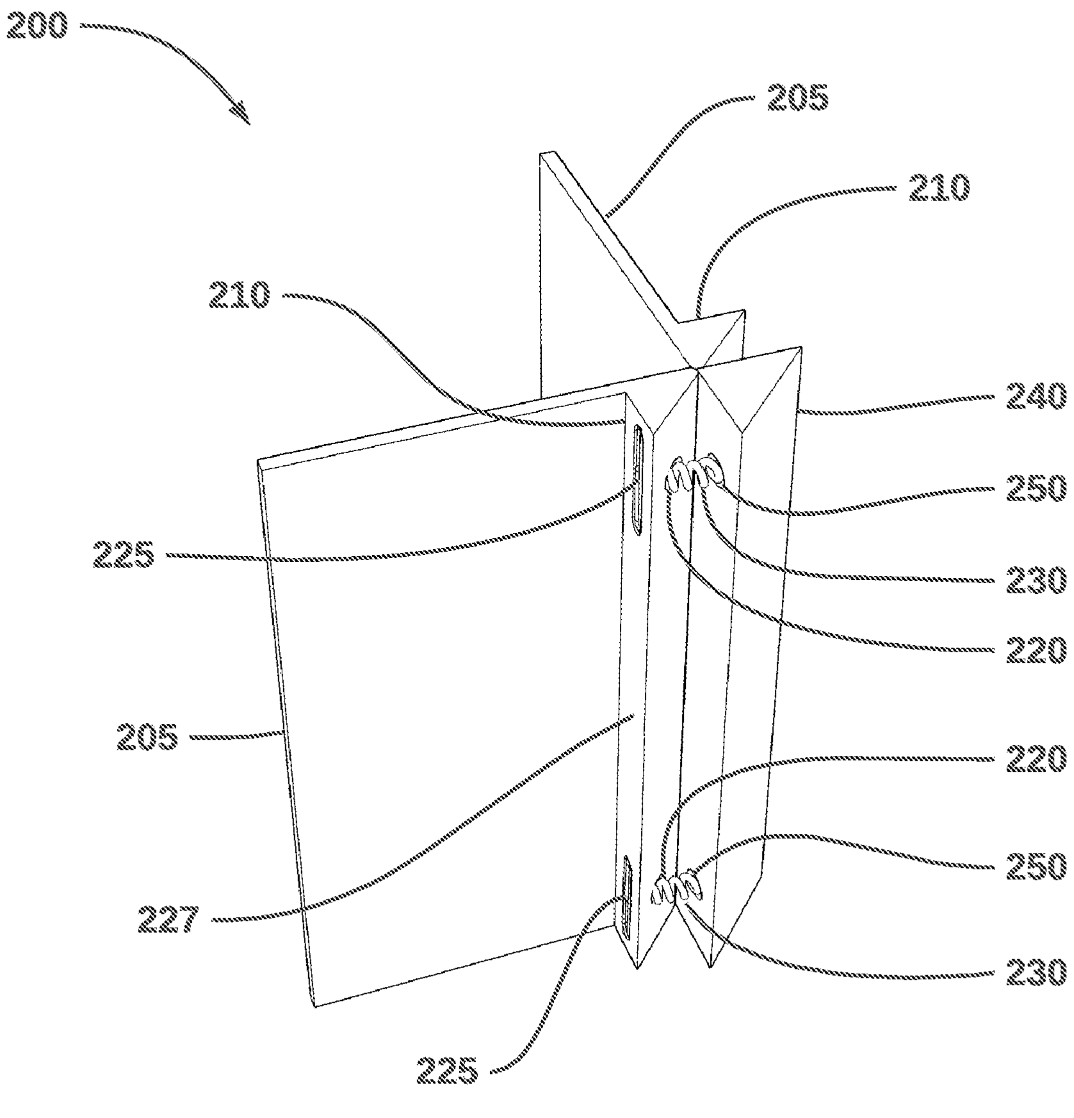
FIG. 2C is an upper left rear perspective view thereof showing the hinge in an assembled partially open configuration.
Figure 2D:
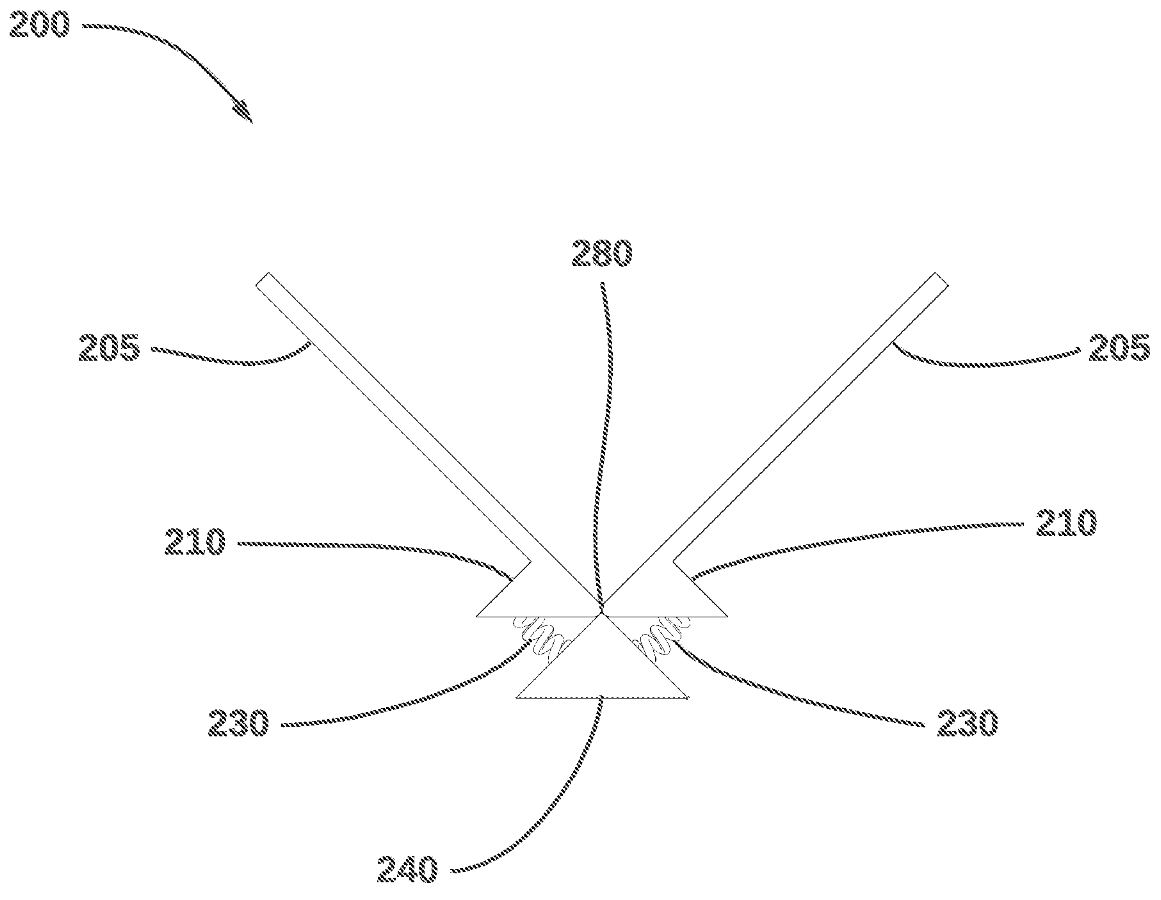
FIG. 2D is a top view thereof shown in a partially open configuration.
Figure 2E:
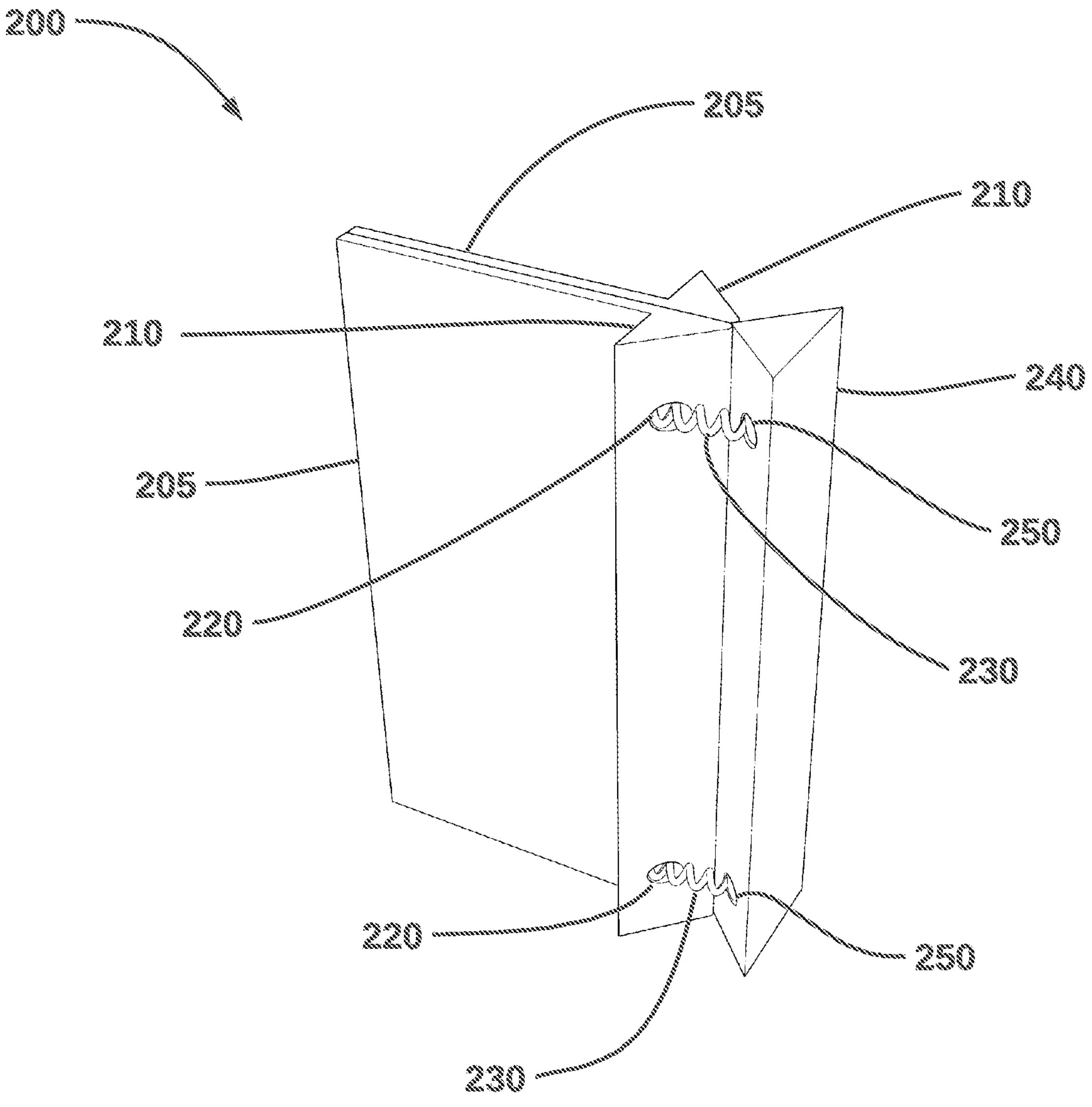
FIG. 2E is an upper rear perspective view thereof shown in a fully open configuration.

While FIGS. 1A-1E show the ends of the springs 130 hidden within each support in the closed position for improved aesthetic reasons, this is not required for the invention disclosed herein to be effective and other formations including exposed or partially exposed springs and apertures are anticipated as may be desired according to specific needs. Furthermore, as seen in FIGS. 1B and 1E, springs 130 are generally in a parallel relationship, although this is not required.

It is seen that the inner edges 135 of the hinge leaves 105 are disposed adjacent to each other creating a pivot axis enabling the hinge leaves 105 to readily pivot from open to the closed positions guided by springs 130 stretched through spring receiving apertures 120. In a closed configuration, such as seen in FIG. 1A, it will be understood that the springs 130 are in a relatively relaxed configuration, whereas in open or partially open configurations, such as seen in FIGS. 1B-1E, the springs 130 are stretched and in a relatively tensed configuration such that the springs 130 bias the hinge leaves from an open or partially open configuration to the closed configuration.

In this example the hinge can rotate through 180°. In addition, as best seen in FIG. 1A, the inner edges 135 form an engagement seam 180 that is visible when viewing the hair clip from a handle-side vantage point (such as shown in FIG. 1A). This provides a distinct aesthetic advantage over prior art.

While the two hinge leaves 105 in FIGS. 1A-1E are shown having identical shapes, this is not a requirement of the invention. Furthermore, while hinge pins, knuckles, or connectors are not required for the hinge to operate effectively, they are not precluded from use in this invention.

With particular reference to FIG. 1C it can be seen that each end of springs 130 terminates and is retained at retaining ports 125 in retaining wall 127. In other embodiments, the spring ends could pass entirely through apertures 120 and be attached directly to hinge leaves 105.

It is seen in FIGS. 1B-1E that the retaining structures 110 include abutment faces 115 which come into abutting engagement and hold the hinge leaves in a stable position when the hinge leaves are in the closed configuration seen in FIG. 1A.

Referring now to FIGS. 2A-2E, a second embodiment of the invention 200 includes hinge leaves 205, retaining structures 210 having spring receiving apertures 220, and springs 230. Each retaining structure 210 has one or more spring receiving apertures 220 receiving one end of one of the springs 230. As in FIGS. 1A-1E, one or more springs may be held in place by extrusions in the supports, bends or protrusions in the springs, additional pins or fasteners, adhesives, etc. These may be different for each end of the springs. Each end of the spring 230 is retained at one of the retaining ports 225 in retaining wall 227. In other embodiments, the spring ends could pass entirely through apertures 220 and be attached directly to hinge leaves 205.

While the leaves are still coupled using one or more springs or resilient materials, this second embodiment discloses an optional supplementary retention member 240 which may help in orienting the two leaves. This supplementary retention member 240 has spring receiving apertures 250 for springs 230 to stretch through. In addition to helping to orient the leaves and provide structural rigidity to the hinge by providing a surface on which leaves 205 may rotate, it can further guide and provide additional cover for the springs. The two hinge leaves 205 move independently of the supplementary retention member 240 and can rotate through 180°. In addition, only a single engagement seam 280 is visible when viewing the hair clip from a handle-side vantage point as perhaps best seen in FIG. 2A. As in the first embodiment discussed above, this provides a distinct aesthetic advantage over prior art.

While the retaining structures 210 shown in FIGS. 2A-2E are shown with triangular cross-sections corresponding to the triangular cross-sections of supplementary retention member 240, it is understood that variations in the shape of the supports, the leaf ends, and the supplementary members which allow the hinge leaves to rotate or pivot with respect to each other include angled, polygonal/multifaceted, or curved shapes, such as portions of circles, parabolas, ellipses, catenaries, or organic shapes, fall within the ambit of this invention.

While a single retaining structure 210 for each hinge leaf 205 and a single supplementary retention member 240 are shown in FIGS. 2A-2E, it is anticipated that multiple interior retaining structures and multiple supplementary interior members or supports and supplementary interior members divided into multiple pieces may be useful for certain applications.

While the two hinge leaves 205 in FIGS. 2A-2E are shown having identical shapes, this is not a requirement of the invention. Furthermore, while hinge pins, knuckles, or connectors are not required for the hinge to operate effectively, they are not precluded from use in this embodiment of the invention.

Figure 3A:
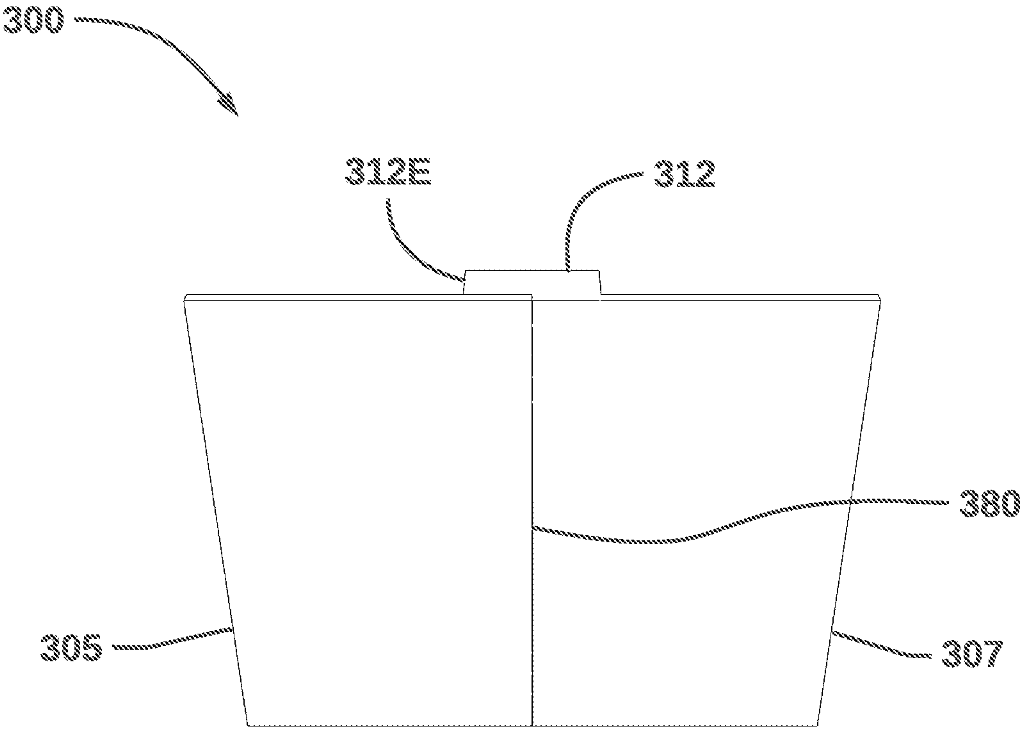
FIG. 3A is an upper front perspective view of a third embodiment of a spring-biased hinge according to the invention in a closed configuration.
Figure 3B:
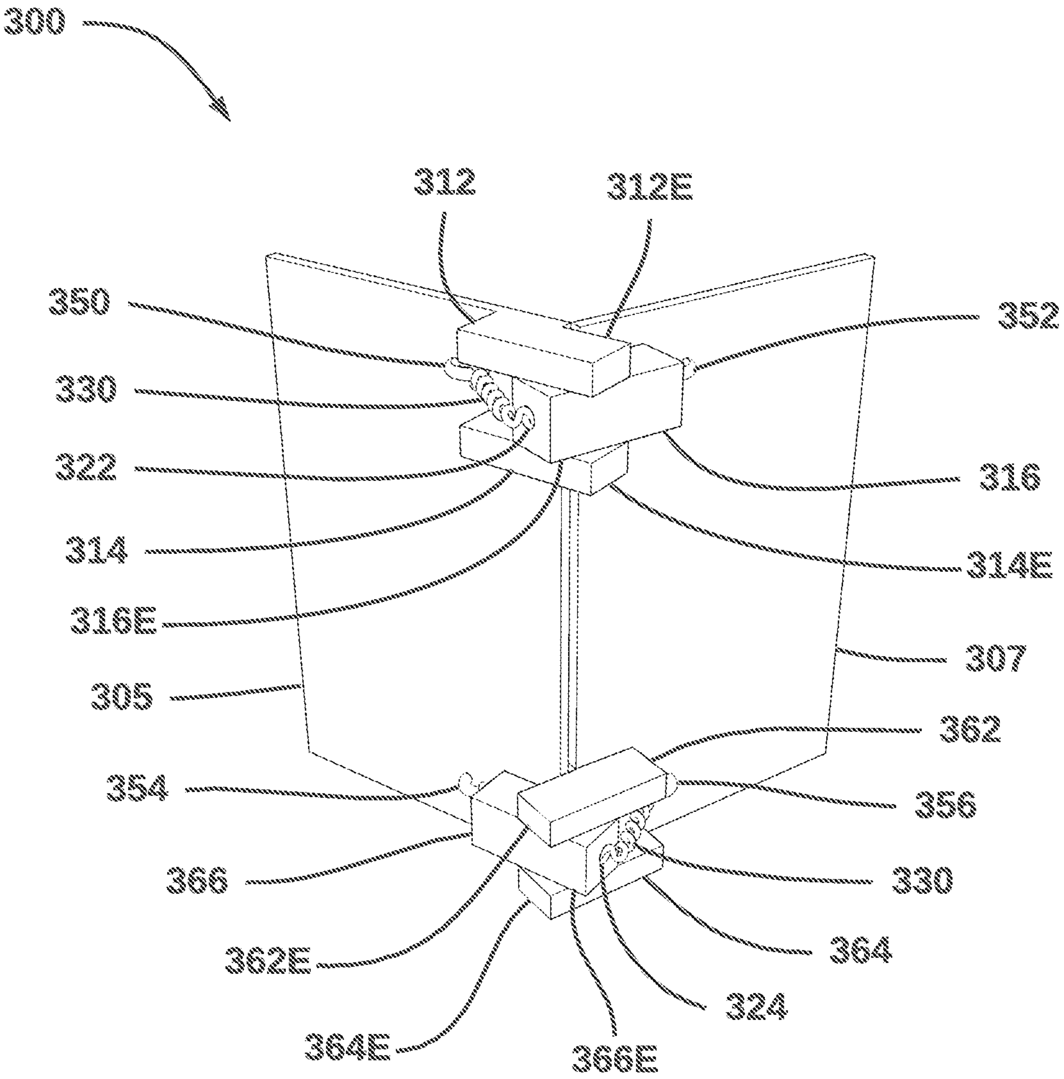
FIG. 3B is an upper rear perspective view thereof shown in a partially open configuration.
Figure 3C:
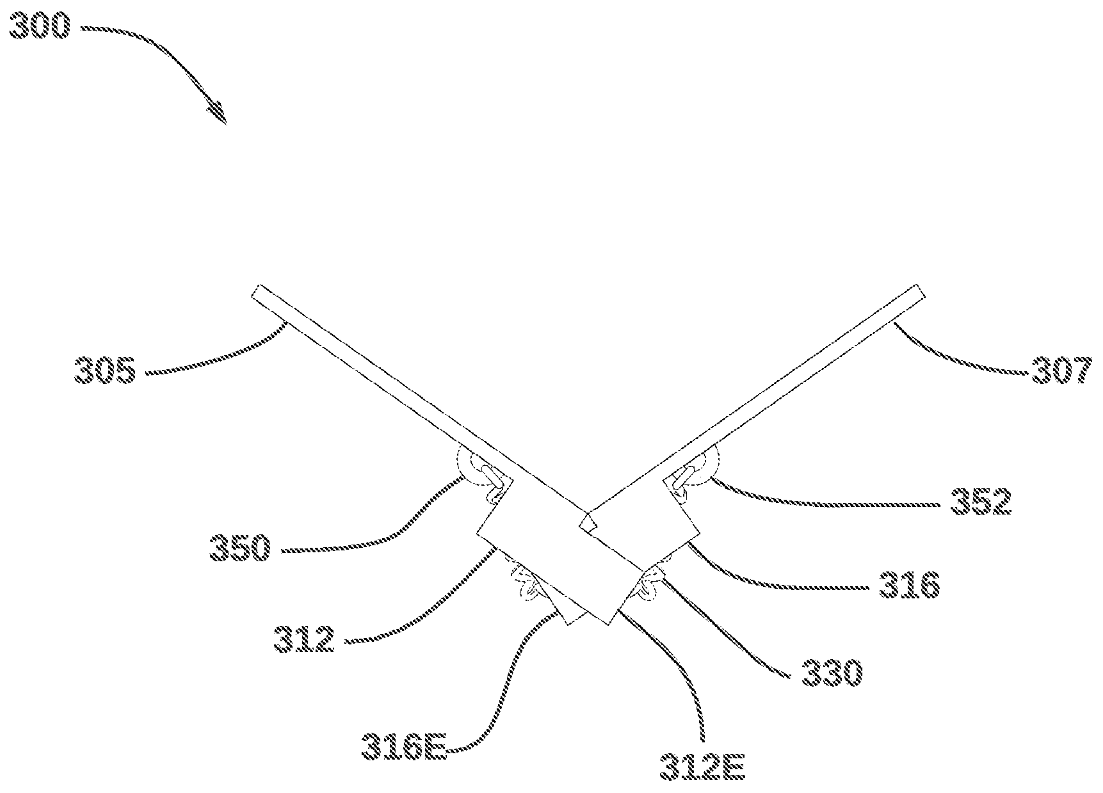
FIG. 3C is a top view thereof shown in a partially open configuration.

In a third embodiment of the invention shown in FIGS. 3A-3C, hinge leaf 307 has an intermediate retaining structure 316 which nests between top and bottom retaining structures 312, 314 which are attached to hinge leaf 305. Similarly, leaf 305 has an intermediate retaining structure 366 which nests between retaining top and bottom retaining structures 362, 364 which are attached to leaf 307. These nesting features are used to orient and align the two hinge leaves 305, 307 on an axis parallel to the engagement seam 380. If desired, friction between the nesting retaining structures 312, 314, 316, 362, 364, and 366 may be used to hold the hinge leaves 305, 307 in a specific position along their arc of travel. Note that retaining structures 312, 314, 316, 362, 364, and 366 each have an extended portion 312E, 314E, 316E, 362E, 364E, and 366E that engage with one of the hinge leaves in the closed configuration, as best seen in FIG. 3A, so that the hinge may lay flat with a simplified visual appearance in which only the engagement seam and faces of the hinge leaves are shown.

With particular reference to FIG. 3B, retaining structures 316, 366 contain apertures 322, 324, respectively, to guide the springs 330, it is seen that the springs 330 are attached to leaves 305, 307 via spring receiving loops 350, 352, and 354, 356, respectively. Alternatively, one or more springs may be held in place by extrusions in the supports, bends or protrusions in the springs, additional pins or fasteners, adhesives, etc. These may be different for each end of the springs.

While the retaining structures seen in FIGS. 3A-3C are shown with a rectangular cross-section, it is understood that variations in the shape of the retaining structures and of the ends of the hinge leaves, which allow the hinge leaves to rotate or pivot with respect to each other and maintain alignment, and may include angled, polygonal, multifaceted, or curved shapes, e.g., portions of circles, parabolas, ellipses, catenaries, or organic shapes, fall within the ambit of this invention.

Since only the single engagement seam 380 is visible when viewed in the closed position shown in FIG. 3A, a distinct aesthetic advantage is realized over prior art hinges. Note that while hinge pins, knuckles, or connectors are not required for the hinge to operate effectively, they are not precluded from use in this embodiment of the invention.

In a fourth embodiment of the invention shown in FIGS. 4A-4E hinge 400 includes two hinge leaves 405 having retaining structures 410. The retaining structures 410 have a square cross-section and abutment faces 415 and the inner ends 407 of the hinge leaves display 405 a slight curvature. It is understood that variations in this shape which allows the leaves to rotate or pivot with respect to each other include angled, polygonal/multifaceted, or curved shapes, e.g., portions of circles, parabolas, ellipses, catenaries, or organic shapes, fall within the ambit of this invention.

Each retaining structure 410 has one or more spring receiving apertures 420 for receiving the coils 430 one or more springs 440. These springs couple, load, and orient the leaves with respect to each other. In the embodiment shown in FIGS. 4A-4E the springs are held in place by legs 450 inserted into holes 455 in the hinge leaves 405 during assembly. Alternatively, the springs may be held in place by extrusions in the supports, bends or protrusions in the springs, additional pins or fasteners, adhesives, etc. These may be different for each end of the springs.

Figure 4A:
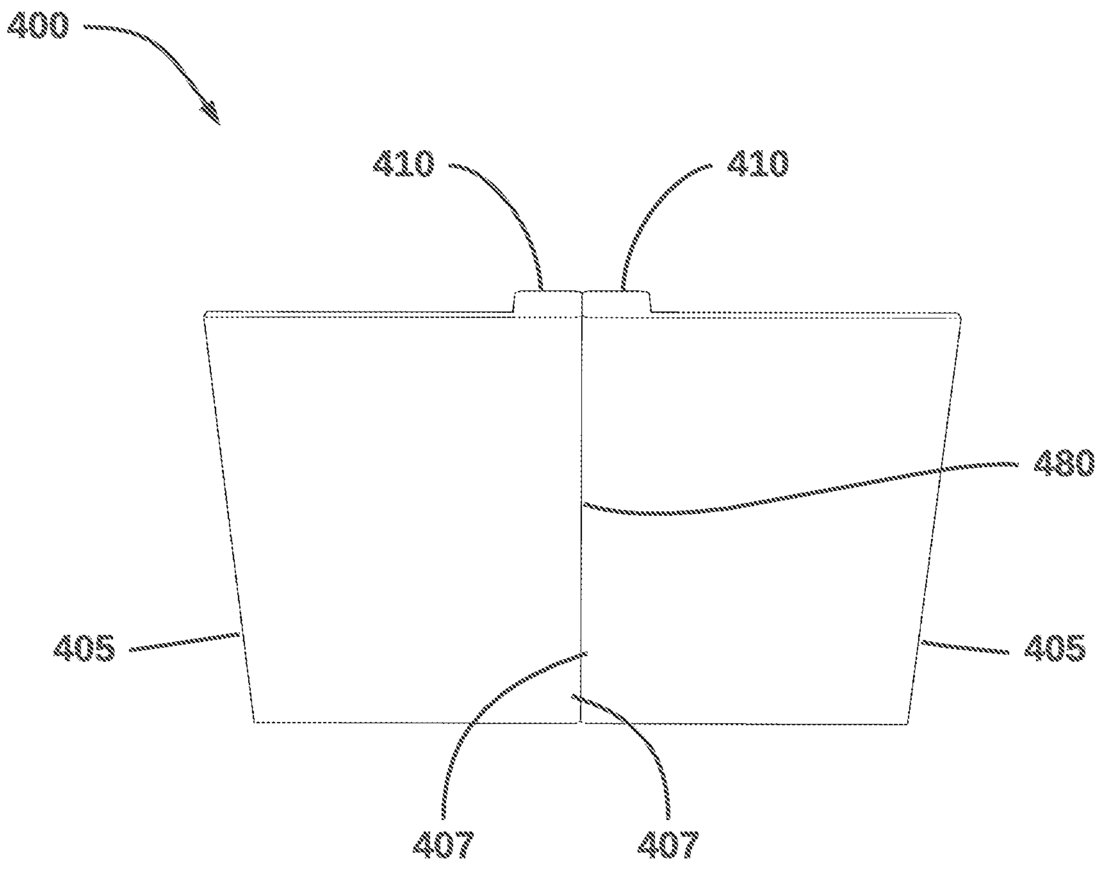
FIG. 4A is an upper front perspective view of a fourth embodiment of a spring-biased hinge according to the invention in a closed configuration.
Figure 4B:
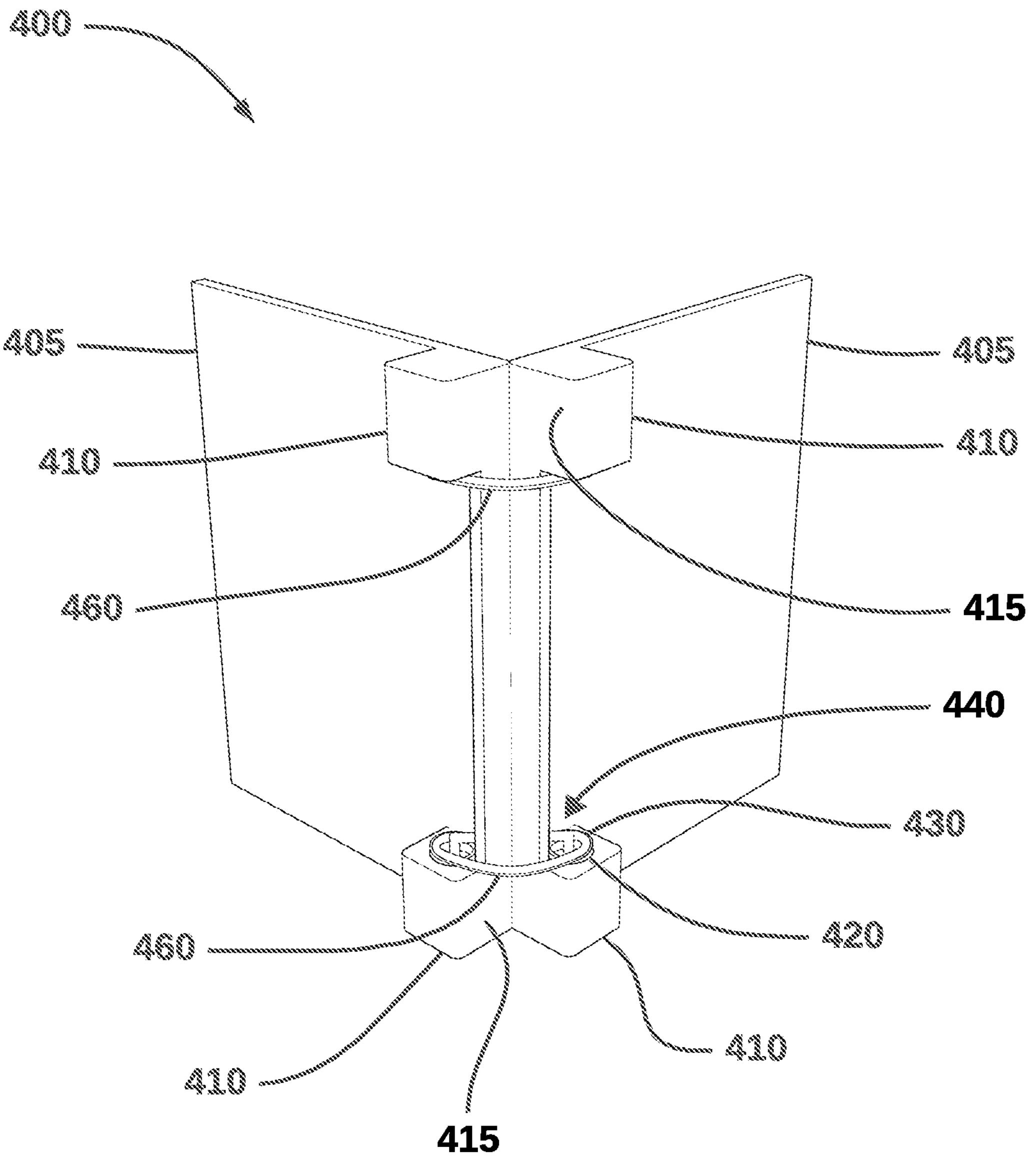
FIG. 4B is an upper rear perspective view thereof shown in a partially open configuration.
Figure 4C:
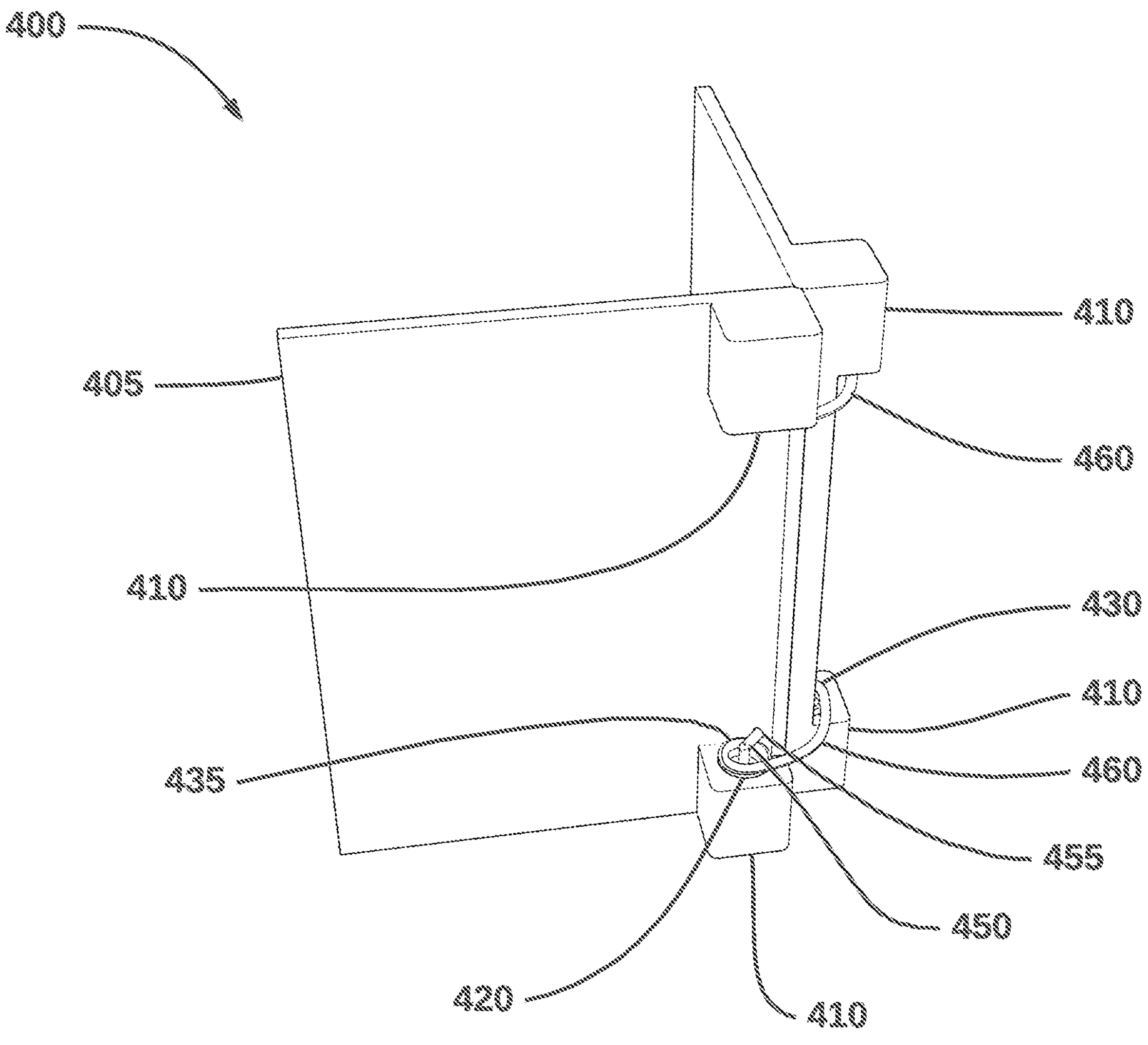
FIG. 4C is an upper left rear perspective view thereof showing the hinge in an assembled partially open configuration.
Figure 4D:
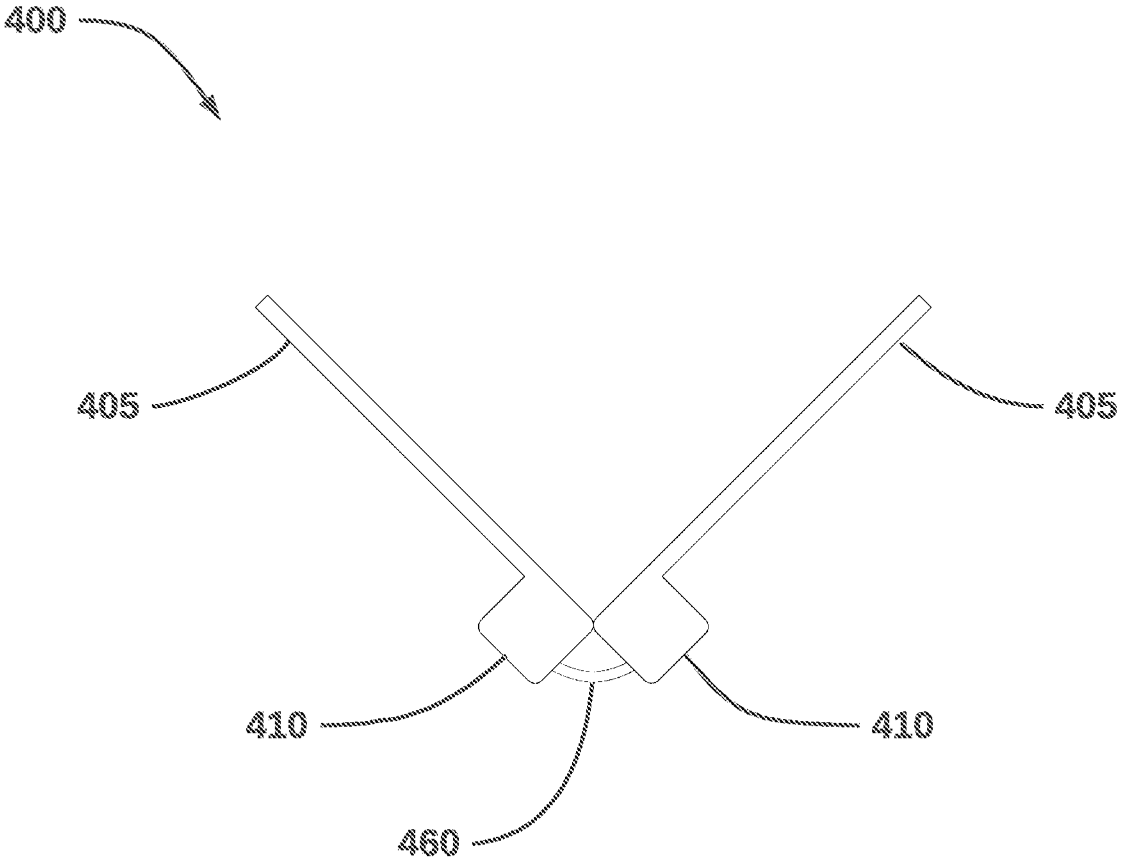
FIG. 4D is a top view thereof shown in a partially open configuration.
Figure 4E:
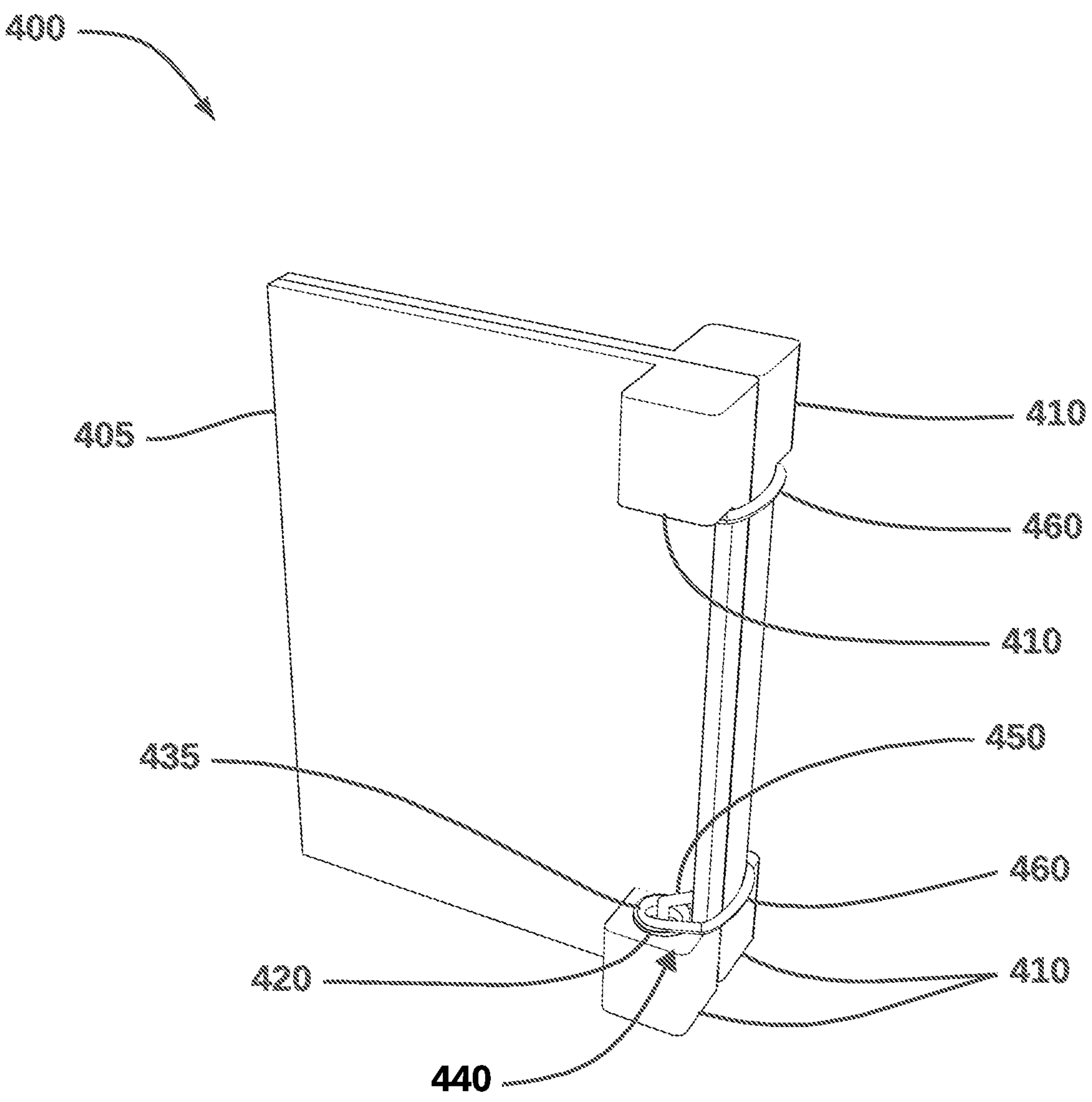
FIG. 4E is an upper rear perspective view thereof shown in a fully open configuration.

While FIGS. 4A-4E show the coils 435 of springs 430 hidden within each retaining structure 410, the legs 450 and curved connector 460 are exposed for ease of assembly. This is not required for the invention disclosed herein to be effective and other formations including exposed or partially exposed springs and apertures are anticipated based on the specific application. Furthermore, as seen in FIGS. 4B and 4E, springs 430 are generally in a parallel relationship, although this is not required.

Leaves 405 are disposed adjacent to each other and can readily pivot from the open to the closed positions guided by springs 430. In this embodiment, as the hinge pivot through 180°, each coil 435 of spring 430 becomes more tightly wound. The shape of the connector 460 may also change during the opening and closing process. In addition, only a single seam 480 is visible from the outside providing a distinct aesthetic advantage over prior art.

While the two leaves in FIGS. 4A-4E are drawn with identical shapes, this is not a requirement of the invention. Furthermore, while hinge pins, knuckles, or connectors are not required for the hinge to operate effectively, they are not precluded from use in this invention.

In a fifth embodiment of the invention shown in FIGS. 5A-5D hinge 500 includes two hinge leaves 505 having retaining structures 510. The retaining structures 510 are shown having a rounded surface and flat abutment faces 525. The inner edges 530 of the hinge leaves 505 are curved to form an engagement seam 540 between them.

A curved leaf spring 550 extends axially along the inner edges 530 of the hinge leaves 505. Each end 555 of the leaf spring 550 is captured in a recess 560 formed by one of the hinge leaves 550 and one of the retaining structures 510 as seen. As the hinge leaves 505 pivot between a closed position, such as shown in FIG. 5A, and open positions, such as shown in FIGS. 5B-5D, the distance between the recesses 560 of each hinge leaf 505 increases tensing the spring 550 and biasing the hinge leaves 505 toward the closed position.

Figure 5A:
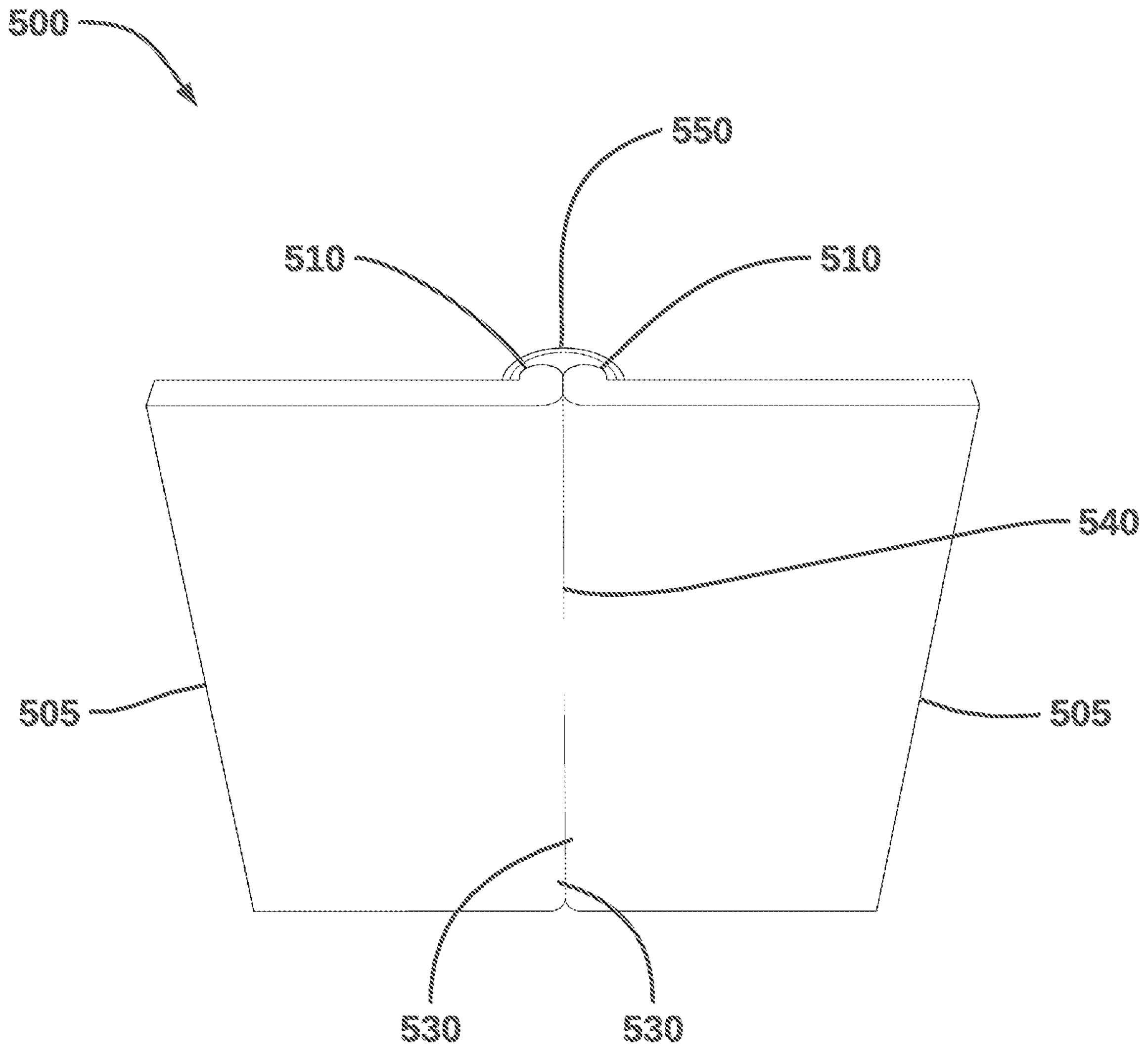
FIG. 5A is an upper perspective view of a fifth embodiment of a spring-biased hinge according to the invention showing the hinge in an open configuration.
Figure 5B:
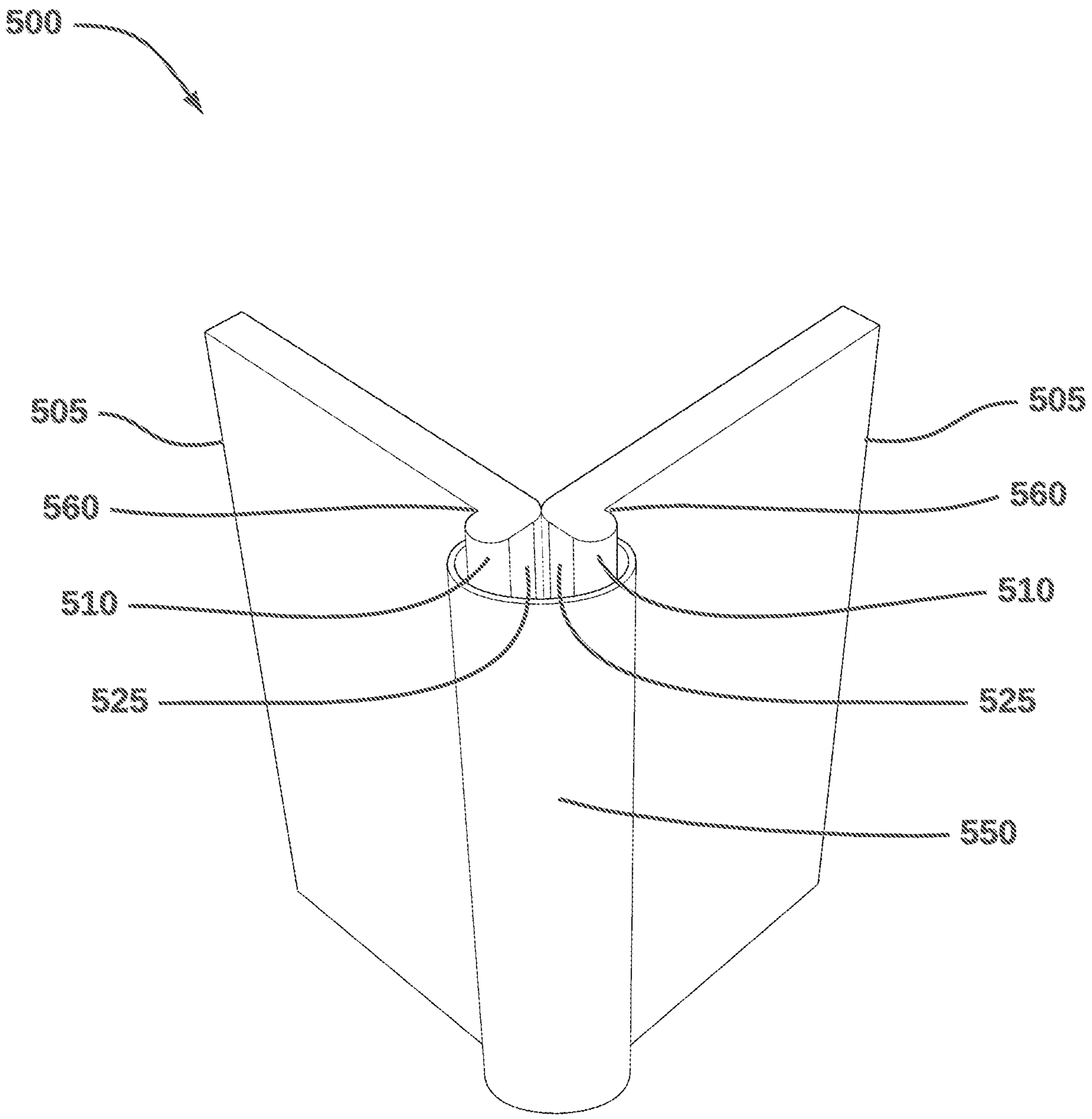
FIG. 5B is an upper perspective view thereof showing the hinge in a partially open configuration.
Figure 5C:
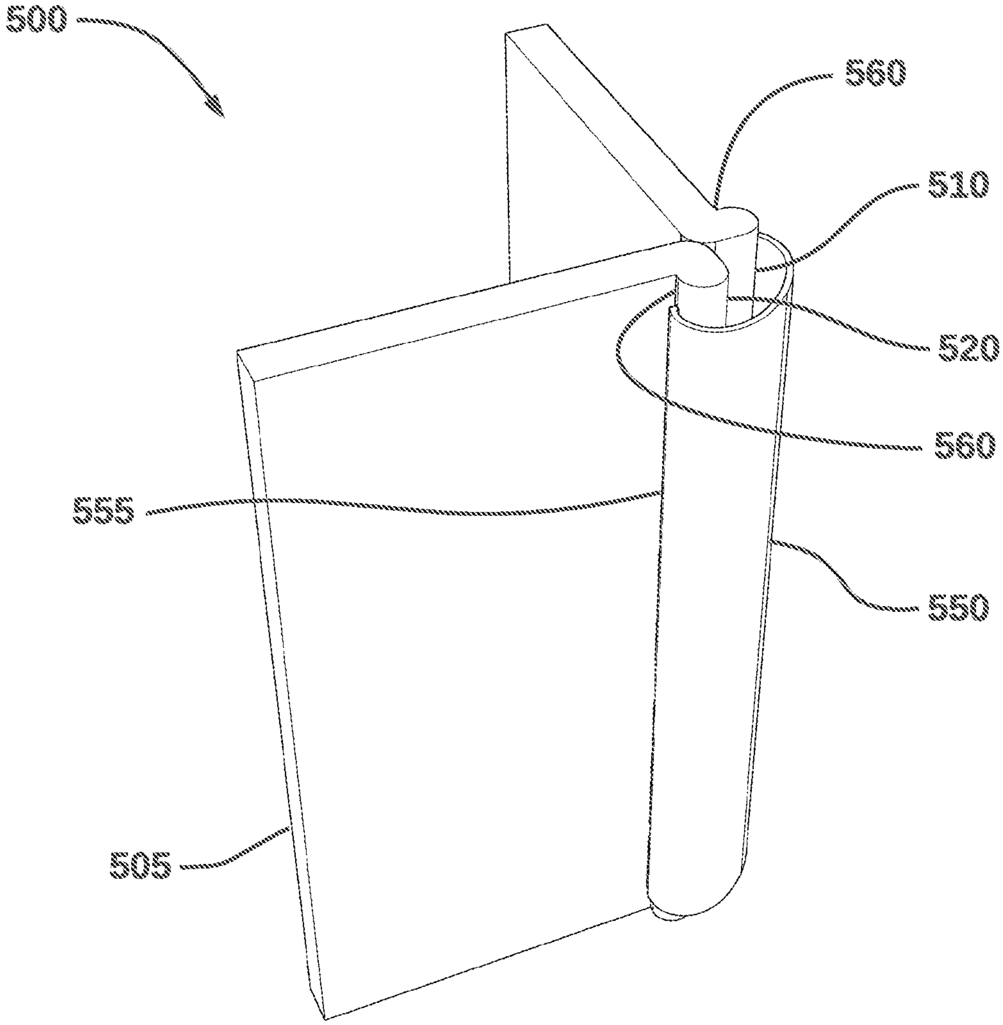
FIG. 5C and an upper left perspective view thereof showing the hinge in a partially open configuration.
Figure 5D:
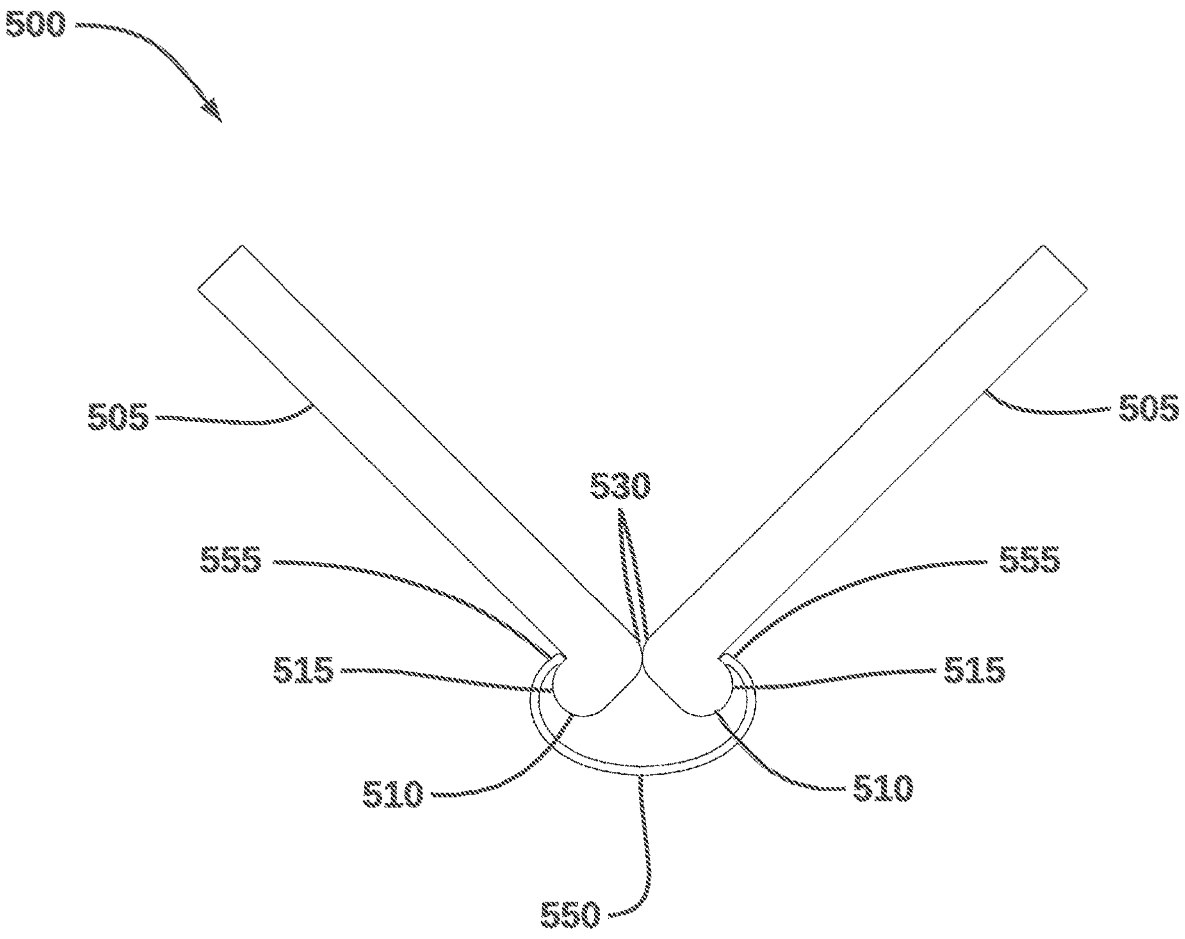
FIG. 5D is a plan view thereof showing the hinge in a partially open configuration.

As perhaps best seen in FIG. 5A, the spring 550 is hidden behind the hinge leaves 505 and engagement seam 540 thereby presenting a cleaner aesthetic appearance than prior art hinges.

It is understood that variations in the shape, size, and number of the gaps including, but not limited to, polygonal or curved shapes, e.g., portions of circles, parabolas, ellipses, catenaries, or organic shapes and designs, fall within the ambit of this invention. Furthermore, the cross-section of any gap may be different on each leaf. Finally, while no hinge pins, knuckles, or connectors are required for the hinge to operate effectively, they are not precluded from use in this or any embodiment of the invention.

It will be understood that while the examples disclosed above use a coiled spring, other types of springs or components (such as split rings) and other resilient materials fall within the ambit of the invention and could be substituted in place of one or more of the coiled springs or resilient materials.

There have thus been described and illustrated certain embodiments of a hinge according to the invention. Although the present invention has been described and illustrated in detail, it should be clearly understood that the disclosure is illustrative only and is not to be taken as limiting, the spirit and scope of the invention being limited only by the terms of the appended claims and their legal equivalents.

We claim:

1. A spring-biased hinge comprising:

two hinge leaves, each hinge leaf having one or more retaining structures, each of the one or more retaining structures disposed at an inner edge of one of the two hinge leaves, at least one of the one or more retaining structures of each of the hinge leaves having an abutment face, and one or more springs, each of the one or more springs having a tensed configuration and a relatively relaxed configuration, each of the one or more springs having two or more spring ends, each of the two or more spring ends retained by one of the one or more retaining structures of one of the two hinge leaves, such that the one or more springs connect the two hinge leaves, the two hinge leaves pivotable about their inner edges between an open configuration and a closed configuration, in the closed configuration the one or more springs in the relaxed configuration and the abutment faces of one or more retaining structures of each of the two hinge leaves are in proximal disposition with the abutment faces of the one or more retaining structures of the other of the two hinge leaves, and in the open configuration the one or more springs in the tensed configuration and the abutment faces of the one or more retaining structures of each of the two hinge leaves are distally disposed from the abutment faces of the one or more retaining structures of the other of the two hinge leaves, and the one or more springs biasing the two hinge leaves from the open configuration to the closed configuration.

2. The spring-biased hinge of claim 1 further comprising:

each of the two hinge leaves having a face, and the one or more retaining structures extending substantially perpendicularly from said face.

3. The spring-biased hinge of claim 1 further comprising:

the inner edges of the hinge leaves disposed in abutting engagement to form an engagement seam therebetween.

4. The spring-biased hinge of claim 1 further comprising:

the one or more springs comprising a helical spring.

5. The spring-biased hinge of claim 1 further comprising:

the one or more springs comprising resilient material.

6. The spring-biased hinge of claim 1 further comprising:

the one or more springs comprising elastomeric material.

7. The spring-biased hinge of claim 1 further comprising:

in the closed configuration the abutment face of the one or more retaining structures of each of the hinge leaves in abutting engagement with the abutment face of one or more retaining structures of the other of the hinge leaves.

8. The spring-biased hinge of claim 7 further comprising:

the one or more springs comprising a helical spring, each of the abutment faces having an aperture, and each of the one or more retaining structures having a retaining wall spaced from the abutment face, each of the one or more springs received in the aperture of the abutment face of one of the one or more retaining structures, each of the two or more spring ends of the of the one or more springs disposed in the retaining wall of one of the one or more retaining structures and a length of each of the one or more springs extending between the retaining wall and the abutment face of one of the one or more retaining structures.

9. The spring-biased hinge of claim 1 further comprising:

one or more supplementary retention members each disposed between the abutment faces of one of the one or more retention structures of each of the two hinge leaves, each of the one or more supplementary retention members having a spring receiving aperture, a portion of one of the one or more springs retained the spring receiving aperture of one of the one or more supplementary retention members.

10. The spring-biased hinge of claim 9 further comprising:

in the closed configuration the abutment faces of at least one of the one or more retaining structures of each of the two hinge leaves in abutting engagement with one of the one or more supplementary retention members.

11. The spring-biased hinge of claim 10 wherein:

at least one of the one or more retaining structures and at least one of the one or more supplementary retention members having a triangular shape.

12. The spring-biased hinge of claim 1 further comprising:

the one or more retaining structures of one of the two hinge leaves including top and bottom retaining structures and the one or more retaining structures of the other of the two hinge leaves including an intermediate retaining structure disposed between and in sliding engagement with the top and bottom retaining structures.

13. The spring-biased hinge of claim 12 further comprising:

the one or more springs comprising a helical spring having two or more spring ends, each of the two or more spring ends fastened to one of the two hinge leaves, and the intermediate retaining structure having a spring-receiving aperture, a portion of the helical spring received in said aperture.

14. The spring-biased hinge of claim 13 further comprising:

each of the top, bottom and intermediate retaining structures having an extended portion extending away from the hinge leaf to which it is attached, in the closed configuration, the extended portions of the top and bottom and retaining structures of one of the two hinge leaves in abutting engagement with the other of the two hinge leaves, and the extended portion of the intermediate retaining structure of one of the two hinge leaves in abutting engagement with the other of the two hinge leaves, thereby restricting pivoting movement of the two hinge leaves about their abutting inner edges.

15. The spring-biased hinge of claim 1 further comprising:

the one or more springs including two coils and a resilient connector interconnecting the two coils, at least one of the one or more retaining structures of each of the hinge leaves having a bore sized to receive one of the two coils, each of the two coils received in the bore of one of the one or more retaining structures of each of the hinge leaves, whereby the one or more springs connect the two hinge leaves.

16. The spring-biased hinge of claim 15 further comprising:

each coil having a distal end and an axially extending pivot axis, the distal end of each coil of the at least one of the one or more springs fixed to one of the one or more retaining structures of one of the hinge leaves.

17. The spring-biased hinge of claim 16 further comprising:

in the open configuration each coil more tightly wound than in the closed configuration.

18. A spring-biased hinge comprising:

two hinge leaves, each hinge leaf having one or more retaining structures, each of the one or more retaining structures disposed at an inner edge of one of the two hinge leaves and extending perpendicularly from the face of the hinge leaf, the inner edges of the hinge leaves in abutting engagement forming an engagement seam therebetween, at least one of the one or more retaining structures of each of the hinge leaves having an abutment face and a retaining wall spaced from the abutment face, each of the abutment faces having an aperture, and one or more helical springs, each of the one or more springs received in the aperture of the abutment face of one of the one or more retaining structures, each of the one or more springs having a tensed configuration in which the spring is stretched and a relatively relaxed configuration in which the spring is shortened, each of the one or more springs having two or more spring ends, each of the two or more spring ends disposed in one of the one or more retaining structures of one of the two hinge leaves and retained by the retaining wall thereof, a length of each of the one or more springs extending between the retaining wall and the abutment face of one of the one or more retaining structures, such that the one or more springs connect the two hinge leaves, the two hinge leaves pivotable about their inner edges between an open configuration and a closed configuration, in the closed configuration the one or more springs in the relaxed configuration and the abutment faces of one or more retaining structures of each of the two hinge leaves are in proximal disposition with the abutment faces of the one or more retaining structures of the other of the two hinge leaves, and in the open configuration the one or more springs in the tensed configuration and the abutment faces of the one or more retaining structures of each of the two hinge leaves are distally disposed from the abutment faces of the one or more retaining structures of the other of the two hinge leaves, and the one or more springs biasing the two hinge leaves from the open configuration to the closed configuration.

19. A spring-biased hinge comprising:

two hinge leaves, each hinge leaf having one or more retaining structures, each of the one or more retaining structures disposed at an inner edge of one of the two hinge leaves and extending perpendicularly from the face of the hinge leaf, at least one of the one or more retaining structures of each of the hinge leaves having an abutment face, and one or more springs, each of the one or more springs including two coils and an integral resilient connector that joins the two coils, at least one of the one or more retaining structures of each of the hinge leaves having a bore sized to receive one of the two coils, each of the two coils received in the bore of one of the one or more retaining structures of each of the hinge leaves, whereby the one or more springs connect the two hinge leaves, each of the one or more springs having a tensed configuration and a relatively relaxed configuration, each of the one or more springs having two or more spring ends, each of the two or more spring ends retained by one of the one or more retaining structures of one of the two hinge leaves, such that the one or more springs connect the two hinge leaves, each of the two coils of each of the one or more springs having a distal end and an axially extending pivot axis, the distal end of each said coil fixed to one of the one or more retaining structures of one of the hinge leaves thereby forcing the distal end of each of the two coils to move and the coil to wind or unwind with movement of one of the hinge leaves, the two hinge leaves pivotable about their inner edges between an open configuration and a closed configuration, in the closed configuration the one or more springs in the relaxed configuration and the abutment faces of one or more retaining structures of each of the two hinge leaves are in proximal disposition with the abutment faces of the one or more retaining structures of the other of the two hinge leaves, and in the open configuration the one or more springs in the tensed configuration and the abutment faces of the one or more retaining structures of each of the two hinge leaves are distally disposed from the abutment faces of the one or more retaining structures of the other of the two hinge leaves, and the one or more springs biasing the two hinge leaves from the open configuration to the closed configuration.

* * * * *